United States Patent
Sohn et al.

(10) Patent No.: US 10,845,595 B1
(45) Date of Patent: Nov. 24, 2020

(54) DISPLAY AND MANIPULATION OF CONTENT ITEMS IN HEAD-MOUNTED DISPLAY

(71) Applicant: Facebook Technologies, LLC, Menlo Park, CA (US)

(72) Inventors: Alexander Sohn, Bellevue, WA (US); Jacques Gollier, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 40 days.

(21) Appl. No.: 15/857,522

(22) Filed: Dec. 28, 2017

(51) Int. Cl.
  *G02B 27/01* (2006.01)
  *G06F 3/01* (2006.01)
  *G06F 3/0481* (2013.01)

(52) U.S. Cl.
  CPC ......... *G02B 27/0172* (2013.01); *G06F 3/013* (2013.01); *G06F 3/04812* (2013.01); *G02B 2027/014* (2013.01); *G02B 2027/0138* (2013.01); *G02B 2027/0187* (2013.01)

(58) Field of Classification Search
  CPC ........ G02B 27/0172; G02B 2027/0138; G02B 2027/014; G02B 2027/0187; G06F 3/04812; G06F 3/013
  See application file for complete search history.

(56) References Cited

U.S. PATENT DOCUMENTS

| | | | | |
|---|---|---|---|---|
| 9,274,599 | B1* | 3/2016 | D'Amico | G06F 3/013 |
| 2015/0116197 | A1* | 4/2015 | Hamelink | G06F 3/013 345/156 |
| 2015/0287158 | A1* | 10/2015 | Cerny | G06F 3/013 345/553 |
| 2017/0285339 | A1* | 10/2017 | Spangler | B32B 17/10788 |
| 2017/0354883 | A1* | 12/2017 | Benedetto | A63F 13/533 |

* cited by examiner

*Primary Examiner* — Sahlu Okebato
(74) *Attorney, Agent, or Firm* — Fenwick & West LLP

(57) ABSTRACT

A head-mounted display (HMD) comprises an electronic display having a display region divided into a central region and one or more periphery regions. The central region may correspond to a binocular field of view of the user, while the periphery regions correspond to portions of a monocular field of view. The HMD further comprises an eye tracking system configured to determine a position of an eye of a user of the HMD. The HMD is configured to display a content item within a periphery region of the display that does not interfere with the user's view of content within the central region. In response to a determination by the eye tracking system that the user's eye is directed at the displayed content item within the periphery region, the HMD changes a visual property of the content item.

22 Claims, 8 Drawing Sheets

DISPLAY AND MANIPULATION OF CONTENT ITEMS IN HEAD-MOUNTED DISPLAY

BACKGROUND

The present disclosure generally relates to display of content items in head-mounted displays, and specifically relates to presentation of content items based upon user motion.

Various artificial reality systems may display content to a user in order to create a more immersive experience. For example, a head-mounted display may include a wide field of view (FOV) display that presents a virtual scene that spans the field of view of a user. When additional content is presented with the scene within the head-mounted display, it may cover important objects in the scene or otherwise break the immersive experience.

SUMMARY

In some embodiments, a head-mounted display (HMD) system comprises an electronic display and an eye tracking system. The electronic display includes a display region comprising a central region and a periphery region defined outside of the central regions. The eye tracking system is configured to determine a position of an eye of a user of the head-mounted display. The HMD system further comprises a processor configured to generate instructions to cause the electronic display to display a content item within the periphery region of the electronic display. The processor further generates instructions to determine whether the user's eye is directed at the content item displayed with the periphery region, based upon the position of the user's eye determined by the eye tracking system, and to, in response to a determination that the position of the eye is directed at the content item, perform a first change of a visual property of the content item. In some embodiments, the processor may be implemented as part of the HMD. In some embodiments, at least a portion of the processor may be implemented on a console or server separate from the HMD of the HMD system.

In some embodiments, the processor changes a visual property of the content item in order in improve a visibility of the content item to the user of the HMD system, or to allow the user to interact with the displayed content item. For example, the processor may change an opacity of the content item, a color of the content item, a size of the content item, a location of the content item, and/or the like. In some embodiments, the processor may instruct the display to provide a reference, link, or other interface element associated with the content item.

In some embodiments, the eye tracking unit of the HMD system continues to track the gaze direction of the user's eye. If the user's gaze direction is determined to be no longer directed towards the content item, then the processor may generate instructions to perform a second change of a visual property of the content item. In some embodiments, the second change may correspond to a reversion of the initial change of the visual properties of the content item. In some embodiments, the second change may comprise changing a content of the displayed content item.

In some embodiments, the HMD system may, using the eye tracking unit, identify an eye gesture performed by the user, corresponding to a predetermined sequence of eye movements, using the tracked eye positions. The eye gesture may also be identified based upon past history of eye movements of the user and/or other correlated user actions. In some embodiments, the HMD system may change the visual properties of the content item differently based upon which eye gesture is performed.

In some embodiments, the HMD may further comprise a hand tracking unit configured to track a spatial location of a hand of the user. The spatial location of the user's hand may be mapped to a spatial location in the display, and may supplement and/or substitute the tracking of the user's eye position in determining how the content item is to be manipulated.

In some embodiments, the HMD may further comprise a head tracking unit configured to track an orientation of the user's head or movement of the user's head. In some embodiments, the tracked movement and/or orientation of the user's head may be used to supplement or substitute the tracking of the user's eye position and/or hand position in determining how the content item is to be manipulated. In some embodiments, the HMD may use different combinations of monitored eye gaze direction/movement, hand position/movement, head orientation/movement in manipulating the displayed content items.

Figure 1:
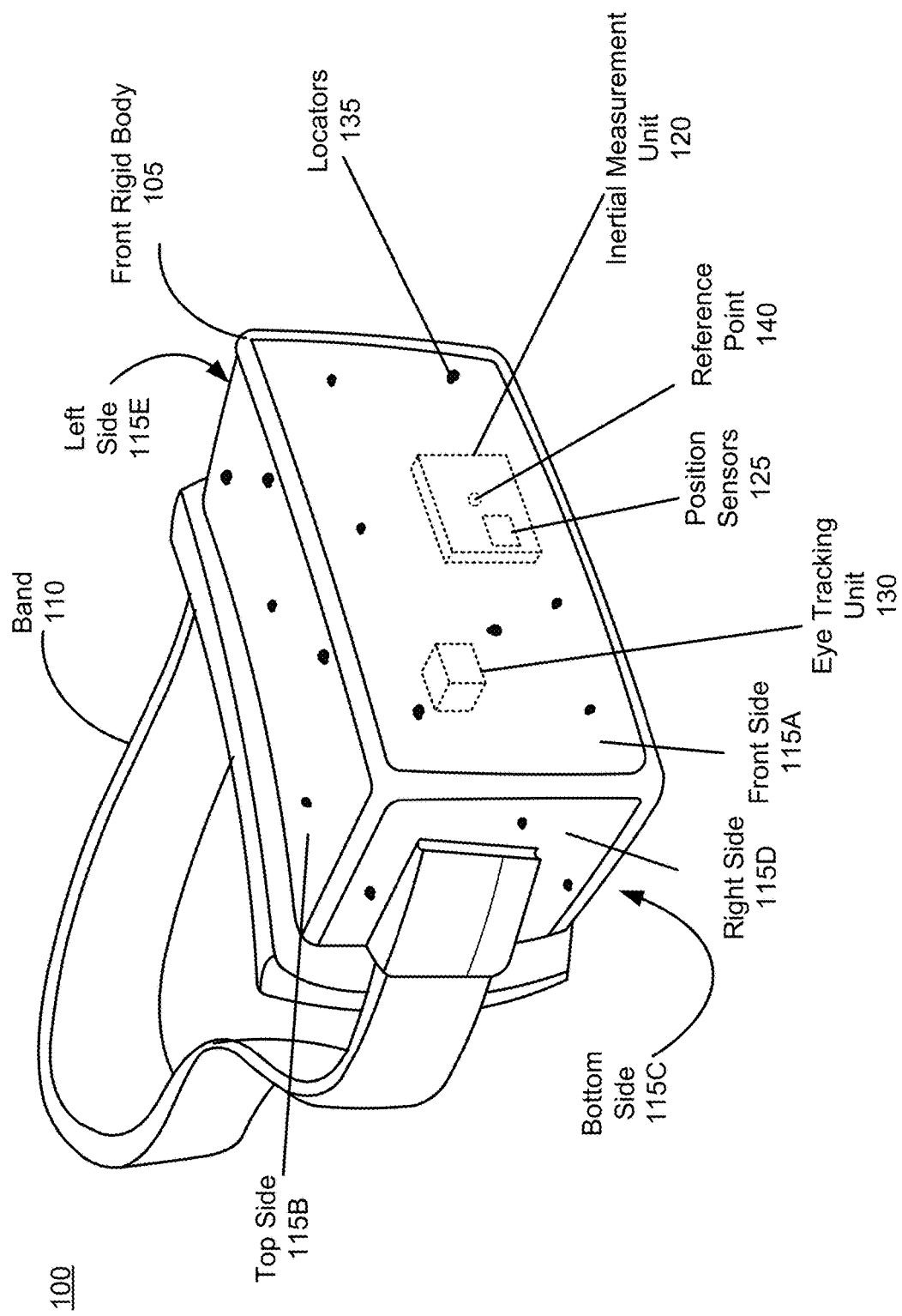
FIG. 1 is a diagram of an HMD, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

A head-mounted display (HMD) includes an electronic display that provides content to a user. The display is sized and positioned relative to the user's eyes to provide a wide FOV display. The display is separated into a central region and one or more periphery regions defined around the central region. In some embodiments, the central region corresponds to a binocular field of the user during stable fixation (e.g., portions of the display visible to both eyes), while the periphery regions correspond to monocular fields of the user during stable fixation (e.g., portions of the display visible to only one eye).

Different types of content may be displayed over the different regions of the display 310. For example, the central region 320 may be used to display main information to the user (e.g., a virtual reality scene, a game scene, a photosphere, or other interactive content). In a virtual reality (VR) environment, the central region may include a virtual scene with virtual objects. In some embodiments, where the HMD system implements an augmented reality (AR) application, the central region may comprise a transparent display, allowing the user to view at least a portion of the local area surrounding the HMD system. Furthermore, virtual objects in the display may overlay actual objects in the local area visible through the display.

On the other hand, the periphery regions may be used to display additional peripheral content to the user. In some embodiments, the peripheral content may comprise user interface elements (e.g., menus, controls, etc.), supplemental information (e.g., attribute values associated with one or more objects visible in the central region), social network content (e.g., a news feed), and/or other type of content. In some embodiments, the peripheral content may comprise one or more advertisements. The peripheral content may be displayed in a manner such that the user, when focusing their attention upon the central regions of the display, will not be disturbed by the peripheral content displayed in the periphery regions. For example, the peripheral content may be positioned in the periphery regions such that it is barely perceptible to the user and does not obscure content displayed in the central region. In some embodiments, the peripheral content is displayed in a partially transparent manner or with other visual properties such as muted colors configured to reduce a potential for the peripheral content to distract the user, unless the user is determined to be deliberately looking towards the peripheral content.

In some embodiments, the HMD system comprises an eye-tracking unit configured to determine a position of the user's eye. The determined position of the user's eye can be used to determine a gaze direction of the user. The gaze direction of the user may correspond to a location on the display. For example, the HMD system may determine, based upon the determined gaze direction of the user, whether the user is looking towards the central region of the display or one of the periphery regions. If the user is determined to be looking directly at peripheral content being displayed in the periphery region, the HMD system may change a visual property of the peripheral content, allowing for easier viewing of the content by the user. For example, the HMD system may change an opacity of the peripheral content, change a size of the peripheral content, change a color of the peripheral content, change a displayed location of the peripheral content, update the peripheral content (e.g., replace a portion of the displayed peripheral content with new peripheral content), move the peripheral content or a portion of the peripheral content into the central region, provide a reference to additional content, and/or the like.

As such, the HMD is configured such that when the user's gaze is directed towards the central region, to display the peripheral content in the periphery region in a first manner that minimizes an amount of intrusion on the user's view of the central region, and to change the visual properties of the peripheral content when the user is determined to be gazing towards the peripheral content.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Example HMD Implementation

FIG. 1 is a diagram of an HMD 100, in accordance with an embodiment. The HMD 100 includes a front rigid body 105 and a band 110. The front rigid body 105 comprises a front side 115A, a top side 115B, a bottom side 115C, a right side 115D, and a left side 115E. The front rigid body 105 includes an electronic display element and an optics block (not shown in FIG. 1). In addition, the front rigid body 105 may comprise an IMU 120, one or more position sensors 125, an eye tracking unit 130, and locators 135. In the embodiment shown by FIG. 1, the position sensors 125 are located within the IMU 120, and neither the IMU 120 nor the position sensors 125 are visible to the user.

The locators 125 are located in fixed positions on the front rigid body 105 relative to one another and relative to a reference point 140. In the example of FIG. 1, the reference point 140 is located at the center of the IMU 120. The locators 125, or portions of the locators 125, are located on a front side 115A, a top side 115B, a bottom side 115C, a right side 115D, and a left side 115E of the front rigid body 105 in the example of FIG. 1. In some embodiments, each of the locators 125 emits light that is detectable by an imaging device (not shown) of an external console. By detecting the light emitted by the locators 125 using the imaging device, a position of the HMD 100 relative to the external console can be determined.

In the example of FIG. 1, the eye tracking unit 130 is not visible from outside of the HMD 100. The eye tracking unit 130 may or may not be in a line of sight of a user wearing the HMD 100. However, the eye tracking unit 130 is typically located (virtually through mirrors, etc., or in actuality) off-axis to avoid obstructing the user's view of the electronic display, although the eye tracking unit 130 can alternately be placed elsewhere. Also, in some embodiments, there is at least one eye tracking unit for the left eye of the user and at least one tracking unit for the right eye of the user. In some embodiments, only one eye tracking unit 130 can track both left and right eye of the user.

Figure 2:
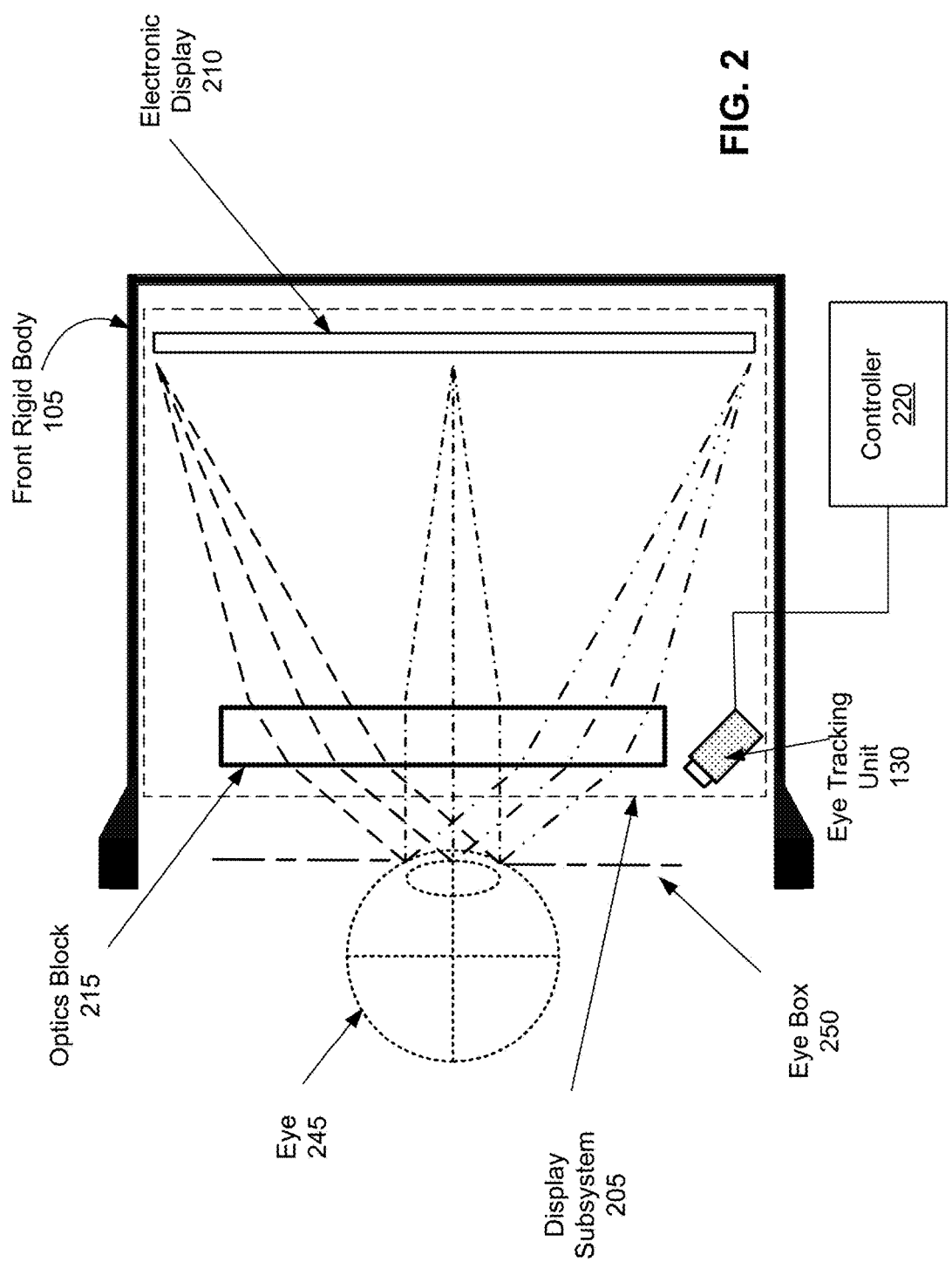
FIG. 2 is a cross-section view of a front rigid body of the HMD in FIG. 1, in accordance with an embodiment.

FIG. 2 is a cross section 200 of the front rigid body 105 of the embodiment of the HMD 100 shown in FIG. 1. As shown in FIG. 2, the front rigid body 105 of the HMD 100 contains a display subsystem 205 comprising an optics block 215 and an electronic display 210, and one or more eye tracking units 220. The electronic display 210 emits image light toward the optics block 215. The optics block 215 magnifies the image light, and in some embodiments, also corrects for one or more additional optical errors (e.g., distortion, astigmatism, etc.). The optics block 215 directs the image light to an eye box 250 for presentation to the user. The eye box 250 is the location of the front rigid body 105 where a user's eye 245 is positioned.

For purposes of illustration, FIG. 2 shows a cross section 200 associated with a single eye 245. Accordingly, a separate display subsystem 205 (comprising a separate optics block 215 and/or electronic display 210) may be used to provide altered image light to other eye of the user. Similarly, separate eye tracking units 220 may be used to track eye movement of the other eye of the user.

As used herein, the position of the eye 245 may inclusively refer to both a spatial location of the eye 245 and an orientation or gaze direction of the eye 245. Eye movement may refer to a change in the position of the eye 245, such as a change in the gaze direction of the eye 245. The gaze direction of the user's eye may correspond to a gaze position, which indicates a location on the electronic display 210 that the eye 245 is currently looking at.

The eye tracking unit 130 can be used to track eye movement and/or position of the eye 245. In some embodiments, the eye tracking unit 130 may comprise a camera configured to capture one or more images of the eye 245. The one or more images are received by the controller 220, which may analyze the captured images to determine a current position of the eye 245. In some embodiments, the eye tracking unit 130 may further comprise a projector or light emitter configured to project one or more light beams or a light pattern over portions of the eye 245. The controller 220 may identify portions of the projected light beams or light patterns reflected from the portions of the eye in the captured images, in order to determine the position of the eye 245. In some embodiments, the eye tracking unit 130 may correspond to an optical coherence tomography (OCT) eye tracking unit, or any other type of system usable to gather data associated with the eye 245 that can be used by the controller 220 to determine a position of the eye 245. In some embodiments, the controller 220 may be implemented as part of the HMD 100. In other embodiments, at least a portion of the controller 220 may be implement on a remote device (e.g., a console associated with the HMD 100).

In some embodiments where the HMD 100 is implemented as part of an AR or MR application, portions of the front rigid body 105 may be transparent, allowing for the user of the HMD 100 to view portions of the local area surrounding the HMD 100. For example, light reflected from objects in the local area may be received through the front side 115A of the rigid body 105, which may be combined with virtual content projected by the electronic display 210. In another example, the HMD 100 may include a camera that captures the local area and provides the captured images to the display 210 in combination with the virtual content.

Display of Content Items in Periphery Regions

Figure 3:
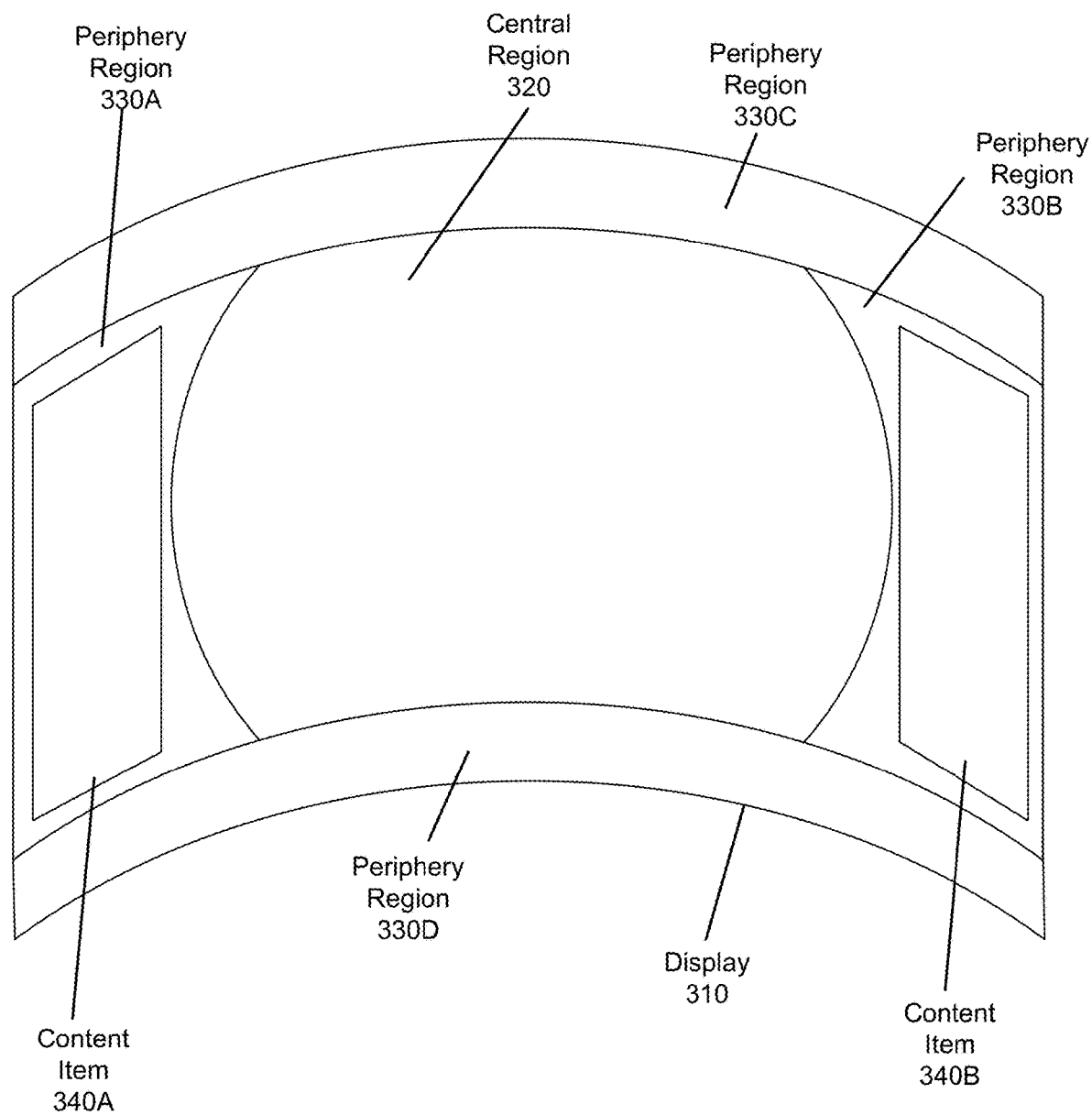
FIG. 3 illustrates a diagram of a field of view of a display, in accordance with some embodiments.

FIG. 3 illustrates a diagram of a field of view of a display, in accordance with some embodiments. The display 310 may correspond to the electronic display 210 of the HMD 100 illustrated in FIG. 2. The display 310 may be sized and positioned with respect to the user's eye(s) to cover a wide field of view. For example, in some embodiments, the display 310 may cover a horizontal field of view of between 160° and 180° with respect to the user's eyes. In some embodiments, a HMD may include two displays 310, one for each eye of the user. In other embodiments, both eyes of the user may share a single display 310.

In some embodiments, the display 310 is separated into a central region 320 and one or more periphery regions 330 (e.g., periphery regions 330A, 330B, 3330C, and 330D). The central region 320 may corresponds to a region of the display 310 where the user is expected to focus most of their attention. For example, the central region 320 may be defined as a binocular portion of the display 310 that is visible to both eyes of the user during stable fixation with a forward facing gaze direction of the eyes (e.g., relative to position of head on which the HMD 100 is mounted). The central region 320 may correspond to a region directly in front of the eyes of the user having a field of view of approximately 90°.

In some embodiments, portions of the display 310 may be at least partially transparent, allowing for receipt of light from the local area. For example, in some AR or MR application, the display 310 may display no content within the central region 320 (e.g., the user views objects in the local area through the central region 320 of the display 310). In some embodiments, the display 310 may be configured to display virtual content overlaid on objects within the local area viewed through the central region 320.

The periphery regions 330 may correspond to regions of the display 310 outside the central region 320. The periphery regions 330 may be defined as monocular portions of the display 310 that is visible to one of the eyes of the user during stable fixation with a forward facing gaze direction of the eyes (e.g., relative to position of head on which the HMD 100 is mounted). For example, as illustrated in FIG. 3, the periphery regions 330A is located to the left the central region 320, and is visible to only the left eye for forward facing gaze. The periphery region 330B is located to the right of the central region 320, and is visible to only the right eye for forward facing gaze. In some embodiments, one or more of the periphery regions 330 (e.g., the periphery regions 330C and 330D) may be located above or below the central region 320.

In some embodiments, one or more content items 340 are displayed in a periphery region 330 (e.g., content items 340A and 340B displayed in the periphery regions 330A and 330B, respectively). In some embodiments, the content items 340 correspond to periphery content that is separate from main or primary content displayed in the central region 320. The content items 340 may correspond to supplemental content indicating information associated with one or more objects (real or virtual) viewed by the user through the central region 320, additional attribute information (e.g., setting or preference information associated with the display 310 or the HMD), content suggestion information (e.g., suggestions for content items to be displayed to the user in the central region 320), social network information (e.g., a newsfeed), an advertisement, and/or the like.

By displaying the content items 340 in the periphery regions 330 (e.g., at least 45° off center in the user's field of view), the user is able to focus on content visible in the central region 320 without the presence of the content items 340 breaking immersive experience. In addition, one or more of the content items 340 may be displayed having visual properties to reduce potential distraction to the user. For example, in some embodiments, the content items 340 may be displayed as substantially transparent or with muted colors or intensity, so as to reduce the potential for distraction to the user.

Figure 4:
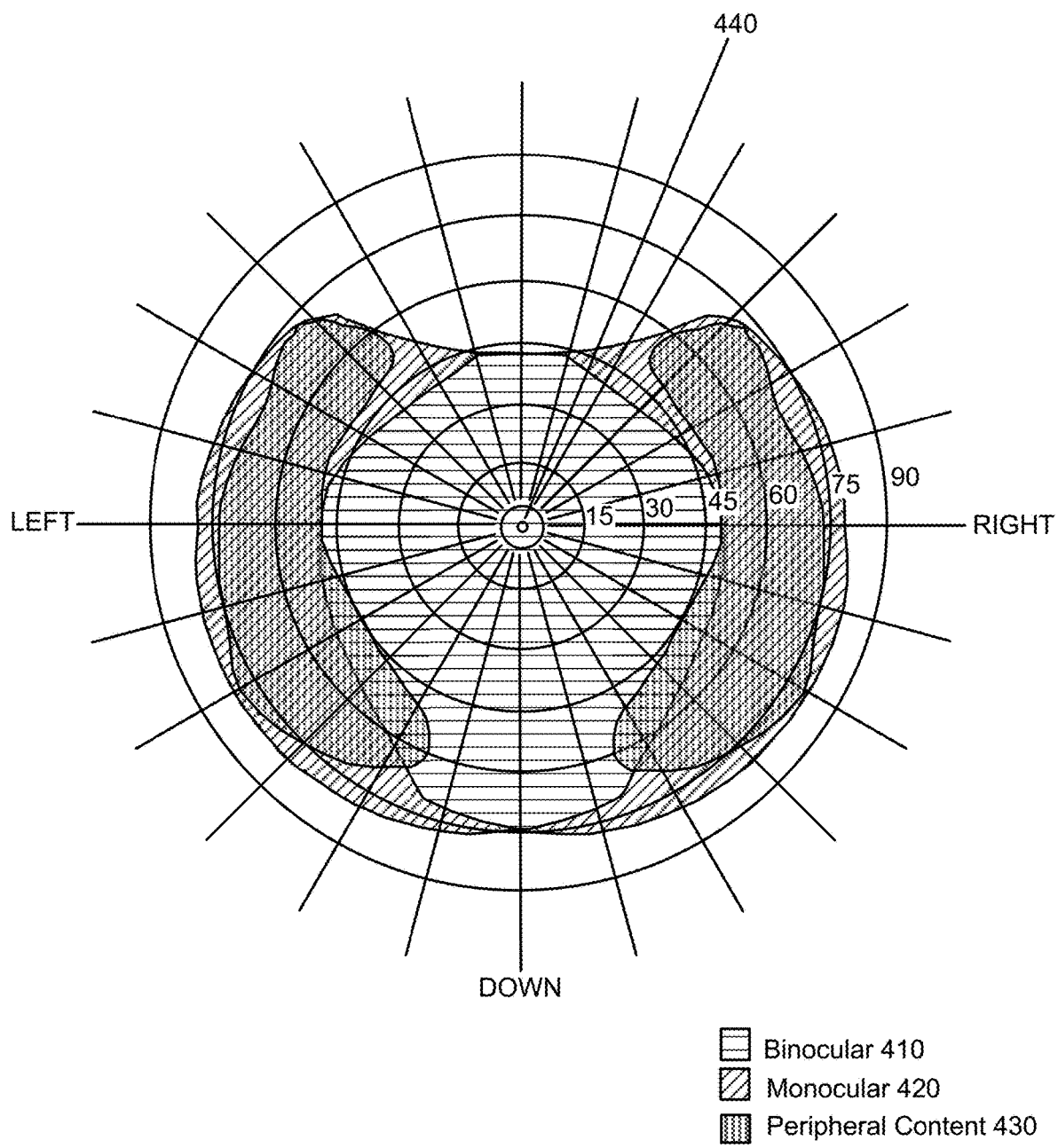
FIG. 4 illustrates a diagram of showing different fields of view of an electronic display for a user, in accordance with some embodiments.

FIG. 4 illustrates a diagram of showing different fields of view that may be associated with a user, in accordance with some embodiments. The user's total field of view is divided into a binocular region 410 corresponding to an intersection of the fields of view the user's eyes, and a monocular region 420 corresponding regions within the field of view of only one of the user's eyes. As illustrated in FIG. 4, the binocular region 410 of the user's field of view spans a horizontal field of view of approximately 90°, while the total field of view of the user (e.g., the union of the binocular region 410 and monocular region 420) may span a horizontal field of view of approximately 150°. The center 440 of the field of view diagram illustrated in FIG. 4 may correspond to a gaze direction of the user when the user is looking straight ahead with the HMD 100 worn on the user's head.

Data is provided to the display 310 such that the central region 320 of the display corresponds to the binocular region 410 of the user's field of view, and the periphery regions 330 correspond to the monocular regions 420 of the user's field of view. For example, as illustrated in FIG. 4, the display may display peripheral content 430 (e.g., content items 340) within a region substantially overlapping with the monocular region 420 of the user's field of view.

While FIG. 4 illustrates the user's field of view when they are looking directly ahead, a user of the display 310 may move their eyes such that their gaze falls upon different locations of the display 310. For example, the user may move their eyes to the left in order to shift their gaze away from the central region 320 to the periphery region 330A, such that they are looking directly at a content item 340A displayed in the periphery region.

Figure 5A:
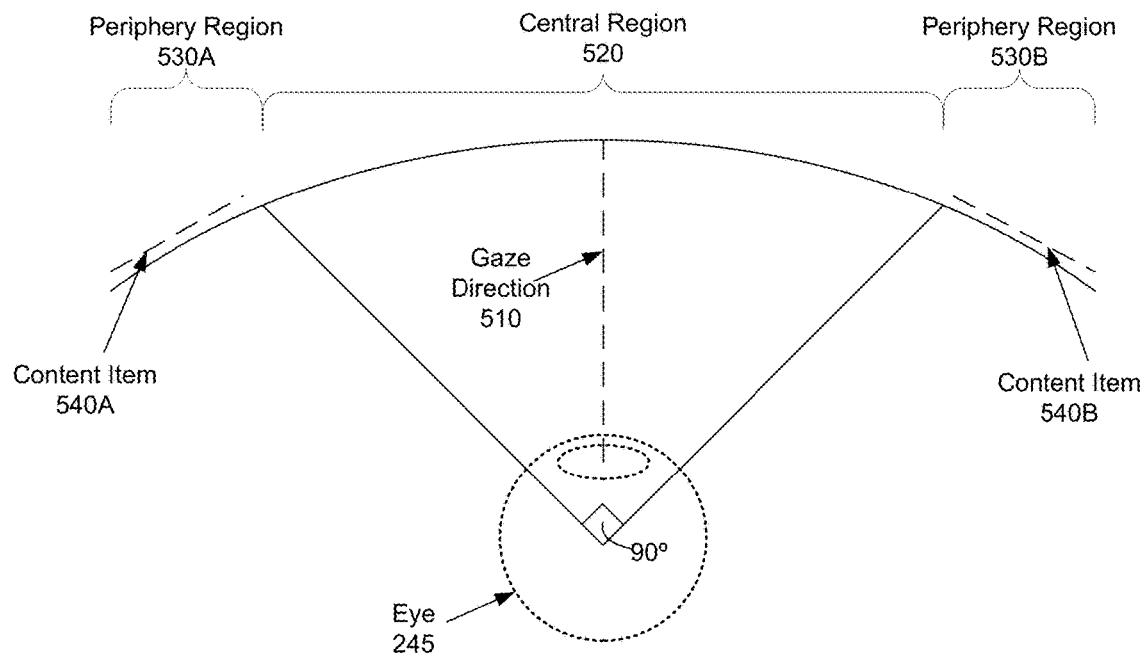
FIG. 5A illustrates a diagram of a user eye position corresponding to a gaze directed toward a central region of an electronic display, in accordance with some embodiments.
Figure 5B:
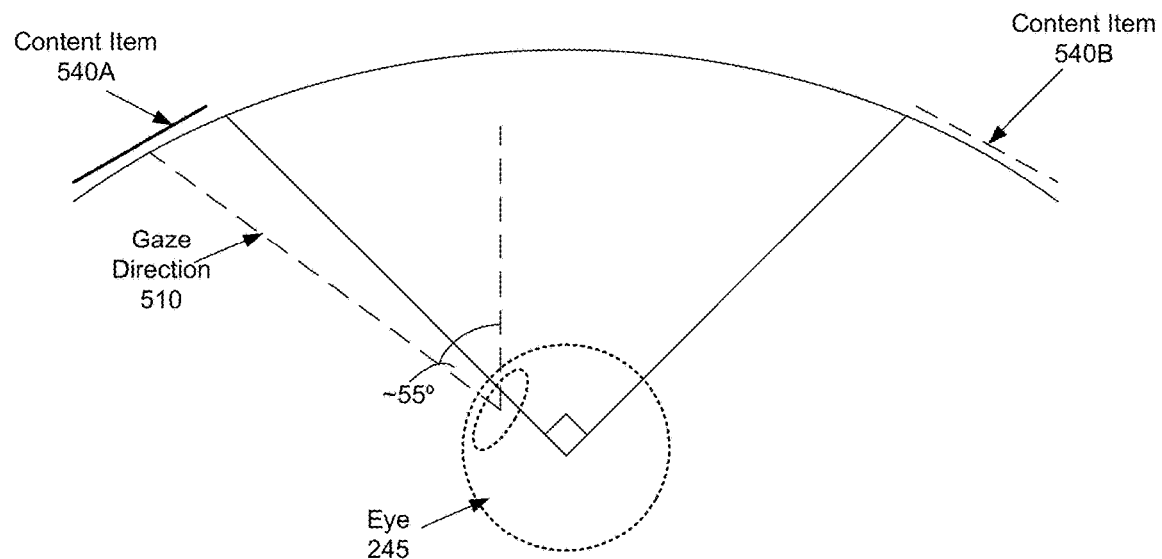
FIG. 5B illustrates a diagram of the user's eye position corresponding to a gaze directed towards the content items displayed in a periphery region, in accordance with some embodiments.

FIGS. 5A and 5B illustrate diagrams of different user gaze directions, in accordance with some embodiments. Although FIGS. 5A and 5B each only illustrate a single eye 245 of the user, it is understood that in some embodiments, the gaze direction of the user is determined based upon a position of both eyes of the user.

As illustrated in FIGS. 5A and 5B, the position of the user's eye 245 may determine a gaze direction 510 of the user. The gaze direction 510 may correspond to a particular angle or orientation within the user's field of view, which, as illustrated in FIGS. 5A and 5B, can be divided into a central region 520 and one or more periphery regions 530 (e.g., periphery regions 530A and 530B). The central region 520 may correspond to a binocular region within the user's field of view, and may correspond to the central region 320 of the display 310 illustrated in FIG. 3. The periphery regions 530 may correspond to monocular regions within the user's field of view, and may correspond to the periphery regions 330 illustrated in FIG. 3. In some embodiments, the central region 520 covers a field of view of approximately 90°. The display may display one or more content items 540 located within the periphery regions 530 of the user's field of view (e.g., the content item 540A displayed within the periphery region 530A of the user's field of view, and the content item 540B displayed within the periphery region 530B).

FIG. 5A illustrates a diagram of a user of the HMD 100 gazing straight ahead, in accordance with some embodiments. As illustrated in FIG. 5A, the user's eye 245 is oriented such that the gaze direction 510 corresponds to the center of the central region 520. While the user's gaze is directed to the central region 520, the content items 540 located in the periphery regions 530 of the user's field of view may be displayed with a first set of visual properties (indicated in FIG. 5A as dotted lines). In some embodiments, the first set of visual properties may correspond to visual properties configured to reduce an amount of potential disruption the displayed content items 540 may have on the user's attention when their gaze is directed towards the central region 520. For example, the content items 540 may be displayed with lowered opacity, muted colors, smaller size, and/or the like.

FIG. 5B illustrates a diagram of the user's eye position corresponding to a gaze directed towards the content items displayed in a periphery region, in accordance with some embodiments. As illustrated in FIG. 5B, the user's eye 245 is in a position (e.g., ~55° off straight ahead) such that the gaze direction 510 corresponds to the content item 540A displayed in the periphery region 530A. In some embodiments, in response to a determination that the gaze direction 510 corresponds to the content item 540A, the HMD changes one or more visual properties of the content item 540A (indicated by a solid line). The one or more changed visual properties may be configured to improve a visibility of the content item 540A, allowing the user to more easily view the content item 540A.

In some embodiments, the HMD may change different types of visual properties of displayed content items in response to the user's gaze. For example, in response to determining that the user's gaze is directed towards the content item 540A, the HMD may change an opacity of the displayed content item 540A (e.g., raise the opacity level of the content item to make the content item easier to view), a size of the content item 540A (e.g., enlarge the content item to improve visibility), a color of the content item 540A (e.g., brighten the colors of the content item), and/or a location of the content item 540A (e.g., moving the content item from its current location to a different location for easier viewing, such as within the central region).

In some embodiments, the HMD may replace at least a portion of the content item 540A with different content. For example, in cases where the content item 540A comprises a video or animation, the content item may be correspond to a first frame of the video or animation when the user's gaze is not directed towards the content item 540A. In response to determining that the user's gaze is directed to the content item 540A, the HMD may be configured to begin playing subsequent frames of video or animation corresponding to the content item 540A.

In some embodiments, the content item 540A may comprise one or more interactive elements that may be interacted with by the user once the HMD determines that the user's gaze is directed to the content item 540A. For example, the user may be able to manipulate interactive elements within the content item 540A by directing their gaze direction 510 to the element for at least a threshold period of time, performing one or more predetermined eye movements, performing a predetermined hand movement, providing an input at an input interface, and/or the like. In some embodiments, the HMD may provide, at the displayed content item, a reference or link (e.g., hyperlink, button, menu, etc.) to additional content items. For example, the displayed content item may provide a reference or link to a webpage or other user interface including another content item.

In some embodiments, the eye tracking system of the HMD (e.g., the eye tracking unit 130), in addition to tracking a current position of the user's eye, may analyze the movement of the user's eye. For example, in some embodiments, the eye tracking unit may detect the position of the user's eye rapidly shifting orientation back and forth between two points of fixation, and identify the movement as a saccade (e.g., may occur while reading, thinking, etc.). In some embodiments, if the eye tracking unit detects the position of the user's eye shifting orientation regularly for at least a threshold time, the eye tracking unit may determine that the user's eye movement is a smooth pursuit (e.g., following a moving object).

On the other hand, if the eye tracking unit detects that the gaze direction of the user's eye remains substantially unchanged for at least a threshold period of time, the eye tracking unit may determine that the user is deliberately looking at content located at a spatial position corresponding to the gaze direction.

Based on the eye movement detected by the eye tracking system, the HMD may change the visual properties of the displayed content item in different ways. For example, in some embodiments, the HMD only changes the visual property of the content item in response to a determination that the user's eye position has a gaze direction corresponding to the content item for a threshold period of time. As such, if the user's eye is performing a saccade or smooth pursuit, the visual properties of the content may be unchanged, even if the gaze direction of the user's eye falls upon the content item during the tracked movement.

In some embodiments, if the user's eye is determined to be following an object other than the content item (such as another displayed content item or, in some AR or MR applications, a real-world object), then the HMD may cause the displayed content item to become less visible or disappear (e.g., reduce an opacity of the content item, mute the colors of the content item, etc.), such that the displayed content item does not distract the user from the object they are following. On the other hand, the HMD may cause the displayed content item to become more visible (as discussed above) in response to a determination that the movement of the user's gaze direction towards the content item displayed in the periphery regions is not due to following another object.

In some embodiments, the HMD may perform additional and/or different actions on the content item based upon a tracked movement of the user's eye. For example, in some embodiments, if the user's eye position has a gaze direction that corresponds to the content item for at least a threshold period of time, followed by a rapid movement towards the central region of the display, the HMD may be configured to change a location of the displayed content item (e.g., from the periphery region to the central region of the display).

In some embodiments, the position of the user's head may be used to select or interact with peripheral content. For example, the HMD may comprise one or more sensors (e.g., the inertial measurement unit 120 and/or the position sensors 125 illustrated in FIG. 1) configured to determine an orientation and/or movement of the user's head. In some embodiments, tracked movement of the user's head may be combined with the tracked position of the user's eyes to determine a type of action to be performed on the displayed content item. For example, in some embodiments, the user moving their head in a direction of the periphery region of the display may be indicative that the user is following an object other than the displayed content item. As such, the visual properties of the content item may be changed to make the content item less visible if the user's gaze direction approaches the location of the content item. On the other hand, if the user's gaze direction moves to correspond to the location of the content item, with less than a threshold amount of accompanying head movement, then the HMD may infer that the user desires to view the content item, and, in response, changes the visual properties of the content item to improve the visibility of the content item. In other examples, the user's eye position is used to activate peripheral content, and the user's head motion may be used to operate a menu or browser window, select a button or link, or otherwise interact with peripheral content.

In some embodiments, the HMD system may further comprise a hand tracking system configured to determine a location of or movement of a hand of the user. In some embodiments, the hand tracking system may comprise one or more sensors mounted on the user's hand. In other embodiments, the hand tracking system may comprise one or more imaging devices (e.g., cameras) configured to capture images of the local area, from which a position of the user's hand can be determined.

In some embodiments, the position or pose of the user's hand may be used to select or interact with peripheral content. The HMD system is configured to map a determined spatial position of the user's hand to a gaze direction associated with the user's eye. For example, the spatial position of the user's hand may be mapped to an eye position corresponding to a gaze direction where the user would be looking directly at the tracked hand. As such, in some embodiments, the HMD may manipulate the displayed content item based upon the spatial position of the user's hand may be used in addition to or instead of the user's eye position.

In some embodiments, in addition to determining a spatial position of the user's hand, the hand position sensor may further track movement of the user's hand, and determine if the user's hand has moved in a manner consistent with one of a plurality of predetermined gestures. As used herein, a gesture may refer to a combination of positions and/or movements of the user's hand. For example, a predetermined gesture may comprise the user's hand moving to a spatial position corresponding to a displayed content item, followed by a horizontal movement of the hand exceeding a threshold speed. In another example, gestures such as swiping motions, grab and drag, or the like, may be used to move a peripheral content item from the periphery region to the central region, or vice versa. In some embodiments, a gesture may be based upon a position or movement of one or more fingers of the user's hand. For example, the user may perform a "hand-opening" gesture by spreading their fingers.

In some embodiments, the HMD system may change the visual properties of a displayed content item in different ways based upon a detected hand gesture of the user. For example, in one embodiment, if the user is determined to have moved their hand to a spatial location corresponding to the content item 540A, the HMD may increase the opacity of the displayed content item 540A, in order to make the content item more visible to the user. On the other hand, if the user is determined to have moved their hand to the spatial location and performed a horizontal swiping gesture (e.g., a horizontal movement of the hand exceeding the threshold speed), then the HMD may instead move the content item 540A from its current displayed location in the periphery region 530A into the central region 520. In some embodiments, the user may perform a gesture to replace the content item 540A with a different content item.

As such, the HMD may be configured to map different types of movements and gestures may the user to different types of actions performed on the content item displayed in the periphery region. For example, the HMD may track eye, head, and/or hand movements of the user to determine different types of gestures performed by the users. The different types of gestures may be used to determine whether the user desires to view the content item displayed in the periphery region or not. If so, the visual properties of the content item may be adjusted to improve visibility of the content item. On the other hand, when the user performs gestures that indicate that they do not desire to view the content item (e.g., if movement in the user's gaze direction is due to the user following movement of an object other than the content item), then the visual properties of the content item may be adjusted to reduce visibility of the content item.

In some embodiments, in addition to changing the visual properties of the content items based upon gaze or hand gestures, audio cues associated with the content items may be used to reinforce certain actions or alert the user to content. For example, in some embodiments, when a new content item is displayed in a peripheral area, the audio cue may be used to alert the user of the newly displayed content item, without obscuring the user's view of the content displayed in the central region. In some embodiments, in response to detecting an eye gesture, hand gesture, or combination thereof associated with a desire by the user to view a content item or selection/interact with an interface element associated with the content item, an audio cue to select the content item and/or perform an operation on the content item may be played to the user, in order to notify the user that the performed gesture has been identified and that the associated action will be performed.

Process Flow

Figure 6:
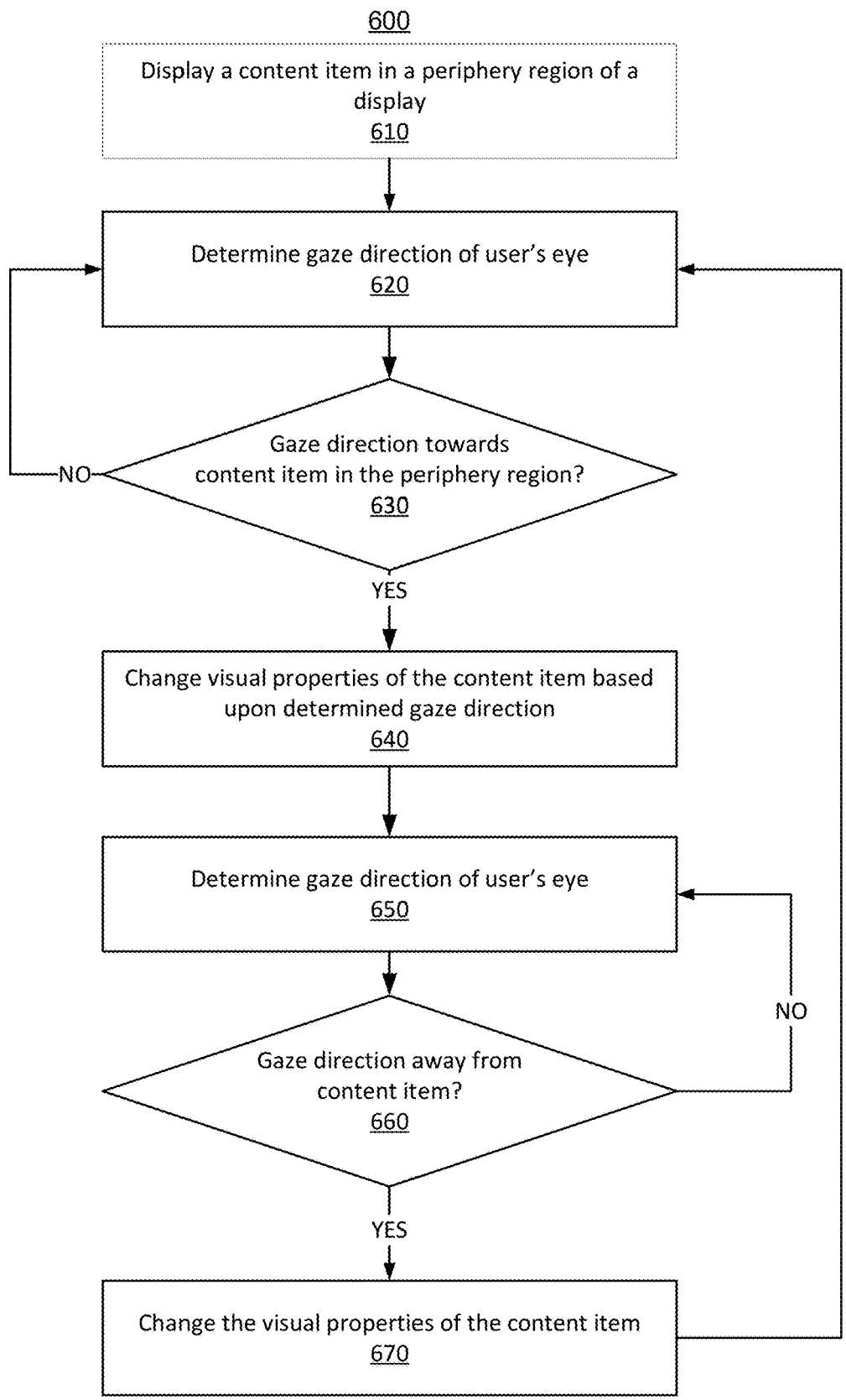
FIG. 6 is a flowchart of a process for displaying content to a user of an HMD, in accordance with some embodiments.

FIG. 6 is a flowchart of a process 600 for displaying content to a user of an HMD, in accordance with some embodiments. The HMD, which may correspond to the HMD 100 illustrated in FIG. 1, displays 610 content to the user via a display. The display may include a display region comprising a central region and at least one periphery region. The central region may correspond to a binocular field of view associated with the user, and have a field of view of approximately 90°. The periphery regions may correspond to a monocular field of view associated with the user, and may span a horizontal field of view between 160° and 180°.

In some embodiments, the displayed content may comprise content displayed within the central region of the display. For example, the content displayed in the central region may correspond to a video rendered by an application executed by the HMD or a console associated with the HMD (e.g., the console 710 illustrated in FIG. 7). In some embodiments, the content may comprise one or more virtual objects displayed to the user of the HMD. The virtual objects may be part of a virtual scene (e.g., in a VR application) and/or overlaid on one or more real objected viewable by the user through the central region of the display (e.g., in an AR or MR application).

In some embodiments, the displayed content comprises at least one content item displayed in a periphery region of the at least one periphery region. In some embodiments, where the displayed content includes a virtual object that is presented in the central region, the content item displayed in the periphery region may be selected based on an object presented in the virtual scene. For example, if the user is looking at a virtual automobile object presented in the central region, a content item associated with automobiles may be presented in the periphery region. In some embodiments, the content item may be selected based on tracking eye position of the user in the central region, determining an object in the central region that the user is looking at (e.g., for a predetermined fixation period), and presenting the content item associated with the object in the central region. In addition to objects in the central region, the content item may be selected using various other techniques. For example, the user's profile, interests, group membership, browsing history, purchase history, likes, friends, shared content, etc., in a social networking system or other online system may be used to select the content item according to relevance to the user. The at least one content item may be displayed with a first set of visual properties configured to reduce an amount of potential distraction to the user when the user is looking at the central region of the display (e.g., reduced opacity, chromaticity, and/or the like).

While content is being displayed to the user, the HMD uses an eye tracking unit to determine 620 a gaze direction of the user's eye. The eye tracking unit may utilize any type of technique to determine the position of the eye. For example, in some embodiments, the eye tracking unit comprises a camera or other type of imaging device configured to capture one or more images of the eye. The eye tracking unit may use shape recognition techniques to determine a location of the user's pupil or iris within the captured images, in order to determine a position of the eye. In some embodiments, the eye tracking unit may further comprise a projector configured to project one or more light patterns over portions of the eye.

The HMD determines 630 if the determined gaze direction of the user's eye is directed towards the at least one content item in the periphery region of the display. In some embodiments, the eye tracking unit maps the determined gaze direction to a spatial location within the display. As such, the HMD is able to determine whether the gaze direction of the user's eye corresponds with the content item displayed at particular spatial locations within the display. In some embodiments, the HMD uses a threshold time for fixation of the eye on the content item in the peripheral region to determine that the eye is directed toward the content items. For example, if the gaze direction of the user's eye is not directed towards the at least one content item in the periphery region for at least a threshold period of time, the HMD may infer that the user's gaze towards the content item was unintentional, and as such does not determine that the gaze direction of the user's eye is directed towards the displayed content item.

In response to determining that the user's gaze direction is directed towards the content item displayed in the periphery region, the HMD changes 640 a visual property of the content item based upon the determined gaze direction. In some embodiments, the visual property is changed in order to improve visibility of the content item to the user. For example, in some embodiments, the change in visual properties of the content item may be correspond to a change in an opacity of the content item, a change in a color of the content item, a change in the displayed size of the content, a change in the text, a change or a presentation of a user interface, playing multiple frames of a video or animation, providing a browser window, providing a link, button, reference, or menu, and/or the like. In some embodiments, the HMD may be configured to change a location of the content item or a portion of the content item (from the periphery region to the central region of the display).

In addition, in some embodiments audio cues may be used to supplement the change in visual properties of the content item, or alert the user to additional content. For example, an audio cue may be used to signal that the user is about to access or highlight peripheral content (e.g., due to their gaze direction being directed towards the peripheral content). In some embodiments, audio cues may alert a user of peripheral content without obscuring the main content.

On the other hand, if the user's gaze direction is not directed to the content item, the HMD may continue monitoring eye position to determine 620 the gaze direction of the user. In some embodiments, the HMD changes the visual property of the content item only if the user's gaze direction remains directed towards the content item for at least a threshold period of time, or in combination with some other eye, hand, or head movement.

Upon changing the visual property of the content item, the HMD may continue monitoring eye position to determine 650 the gaze direction of the user's eye. The HMD may track the gaze direction of the user's eye in the same manner as discussed above in relation to 620.

As the HMD monitors the gaze direction of the user's eye, the HMD determines 660 if the determined gaze direction of the user's eye has moved away from the content item. For example, the user's eye may have a gaze direction corresponding to a spatial location outside a boundary of the displayed content item.

In response to determining that the user's gaze direction is no longer directed towards the content item, the HMD changes 670 one or more visual properties of the displayed content item. In some embodiments, the HMD may simply revert the previous changes performed on the content item (e.g., at 640). In other embodiments, the HMD may perform additional changes on the visual properties of the content item (e.g., further reduce the opacity or mute the colors of the content item to indicate that the content item has already been viewed, swap the content item for a different content item, and/or the like). In some embodiments, the HMD may determine that the user's gaze position moving away from the content item is part of a predetermined gesture. For example, in some embodiments, the user may quickly move their eyes in a particular direction to cause the HMD to change a displayed location of the content item or perform some other manipulation of the content item.

On the other hand, if the user's gaze direction continues to be directed towards the content item, the HMD may continue monitoring eye position to determine 650 the gaze direction of the user. In some embodiments, the HMD changes the visual property of the content item only if the user's gaze direction remains directed away from the content item for at least a threshold period of time (e.g., the user's gaze direction moving away from the content item not being the result of an unintentional flicker or other eye movement), or in combination with some other eye, hand, or head movement.

In some embodiments, the HMD may, using the eye tracking unit, identify an eye gesture performed by the user, corresponding to a predetermined sequence of eye movements, using the tracked eye positions. In some embodiments, the HMD changes the visual properties of the content item different based upon which eye gesture is performed. For example, if the user blinks rapidly for a threshold number of times while fixated on the content item, the gaze direction may be determined as being directed toward the content item. In some embodiments, different eye gestures and/or gaze positions may be used to select and/or manipulate interface elements associated with the content item (e.g., buttons, links, menu items, and/or the like).

In some embodiments, the HMD may further comprise a hand tracking unit configured to track a spatial location of a hand of the user. The spatial location of the user's hand may be mapped to a spatial location in the display, and may supplement and/or substitute the tracking of the user's eye position in determining how the content item is to be manipulated. For example, in some embodiments, the HMD may select the displayed content item based upon the user's detected hand position, change a displayed location of the content item based upon the user's detected hand movement, manipulate one or more displayed interface elements associated with the content item based upon the user's hand position and/or movements, and/or the like.

In some embodiments, the HMD may further comprise a head tracking unit configured to track an orientation of the user's head or movement of the user's head. In some embodiments, the tracked movement and/or orientation of the user's head may be used to supplement or substitute the tracking of the user's eye position and/or hand position in determining how the content item is to be manipulated. For example, in some embodiments, the HMD may determine that the user's gaze direction is directed towards the content item only if the orientation of the user's head has changed less than a threshold amount during an associated time period. In some embodiments, the HMD may change the visual property of the content item based upon the user's head movement (e.g., after the HMD has determined that the user's gaze direction is directed towards the content item, the user may move their head to cause the HMD to change a displayed location of the content item within the user's FOV). It is understood that in some embodiments, the HMD may use different combinations of monitored eye gaze direction/movement, hand position/movement, head orientation/movement in manipulating the displayed content items.

The HMD system is thus able to display peripheral content to the user outside the user's binocular field of view, in a manner that reduces obtrusiveness or potential for distraction to the user. By tracking a gaze direction of the user (and/or a head movement, hand movement of the user), the HMD system is able to determine when the user actually desires to view the displayed content item and/or interact with the displayed content, and in response, change one or more properties of the content item (e.g., increasing a visibility of the content item, changing a location of the content item, activating one or more interface elements associated with the content item, etc.) to improve an ability of the user to view or interact with the content item.

System Overview

Figure 7:
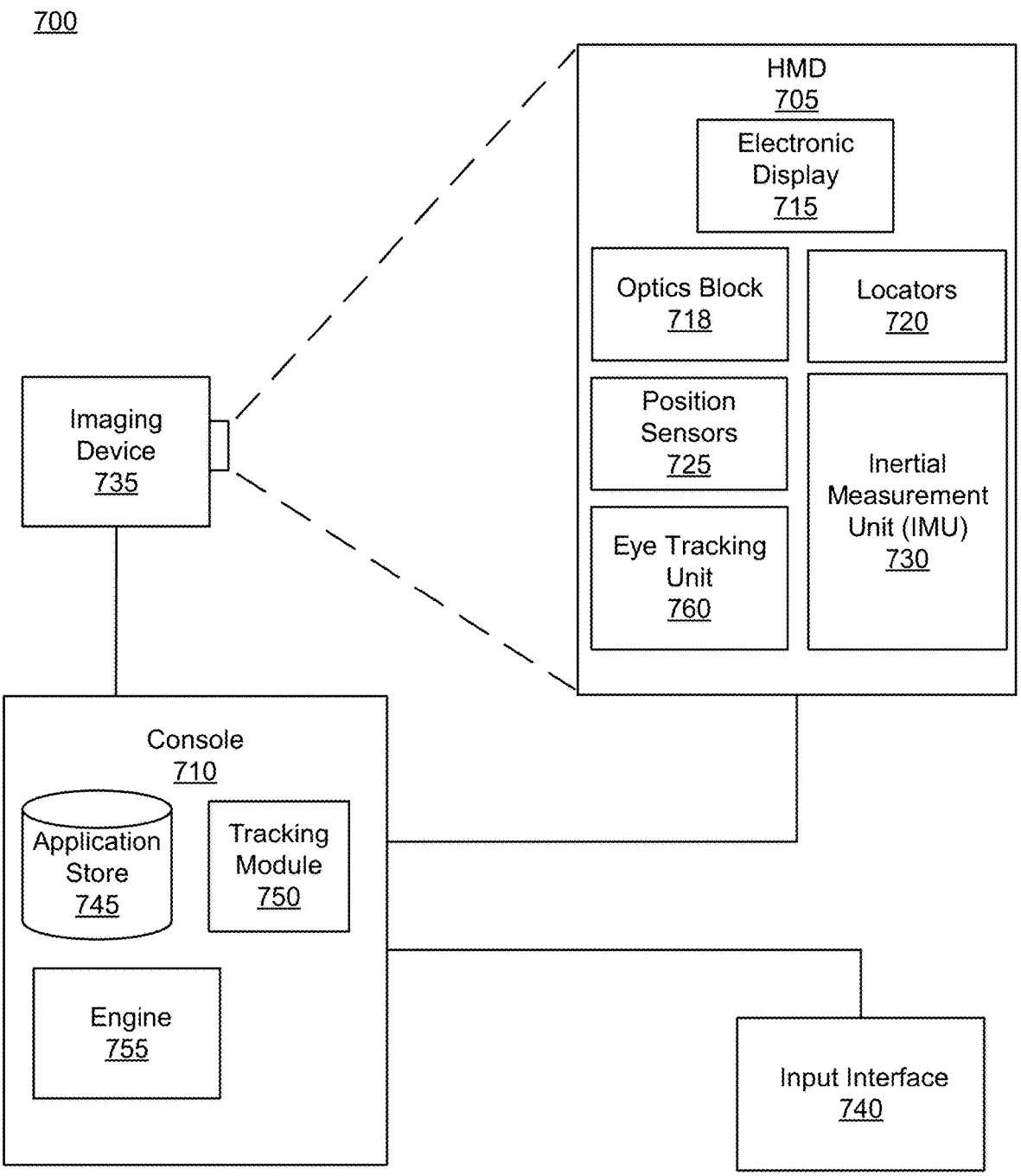
FIG. 7 is a block diagram of an HMD system, in accordance with an embodiment.

FIG. 7 is a block diagram of an HMD system 700. The HMD system 700 shown by FIG. 7 comprises an HMD 705 (which may correspond to the HMD 100 illustrated in FIG. 1), an imaging device 735, and an input interface 740 that are each coupled to the console 710. The HMD system 700 may be used to generate an artificial reality that is presented to a user of the HMD 705. While FIG. 7 shows an example HMD system 700 including one HMD 705, one imaging device 735, and one input interface 740, in other embodiments any number of these components may be included in the HMD system 700. For example, there may be multiple HMDs 705 each having an associated input interface 740 and being monitored by one or more imaging devices 735, with each HMD 705, input interface 740, and imaging devices 735 communicating with the console 710. In alternative configurations, different and/or additional components may be included in the HMD system 700. Similarly, functionality of one or more of the components can be distributed among the components in a different manner than is described here. For example, some or all of the functionality of the console 110 may be contained within the HMD 705.

The HMD 705 is a head-mounted display that presents content to a user, and may correspond to the HMD 100 illustrated in FIG. 1. Examples of content presented by the HMD 705 include one or more images, video, audio, or some combination thereof. In some embodiments, audio is presented via an external device (e.g., speakers and/or headphones) that receives audio information from the HMD 705, the console 710, or both, and presents audio data based on the audio information. The HMD 705 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the HMD 705 may also act as an augmented reality (AR) headset. In these embodiments, the HMD 705 augments views of a physical, real-world environment with computer-generated elements (e.g., images, video, sound, etc.).

Figure 8:
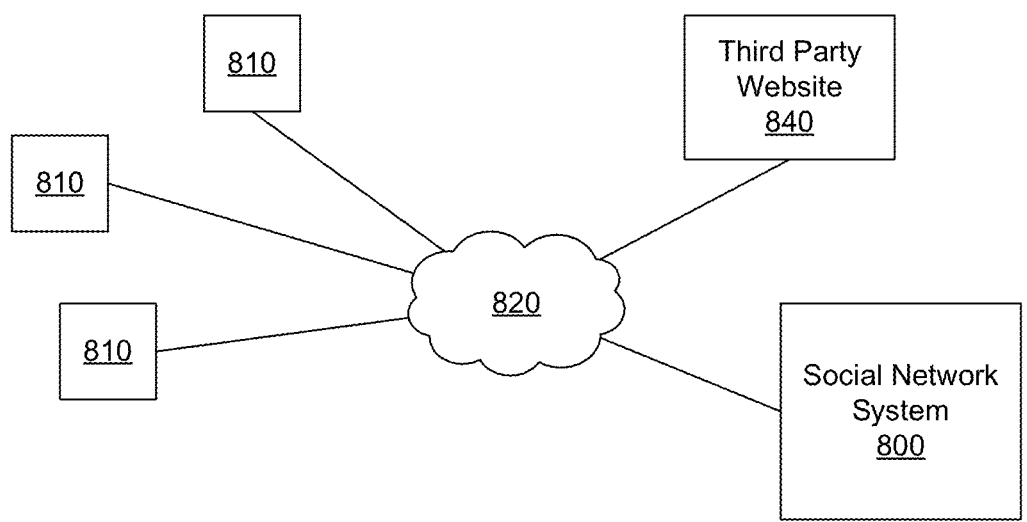
FIG. 8 is a high level block diagram illustrating a system environment suitable for operation of a social network system.

In some embodiments, the HMD 705, the console 710, or both, may be connected to a social network system, such as shown in FIG. 8. The HMD 705 includes an electronic display 715, an optics block 718, one or more locators 720, one or more position sensors 725, an inertial measurement unit (IMU) 730, and an eye tracking unit 760. The electronic display 715, optics block 718, locators 720, position sensors 725, and IMU 730 may correspond respectively to the electronic display 210, optics block 215, locators 135, position sensors 125, and IMU 120 illustrated in FIGS. 1 and 2. The eye tracking unit 760 may correspond to the eye tracking unit 130 of FIG. 2. Some embodiments of the HMD 705 have different components than those described here. Similarly, the functions can be distributed among other components in the HMD system 700 in a different manner than is described here. For example, some of the functions of the eye tracking unit 760 may be performed by the console 710. The electronic display 715 displays images to the user in accordance with data received from the console 710.

The optics block 718 magnifies received light from the electronic display 715, corrects optical errors associated with the image light, and the corrected image light is presented to a user of the HMD 705. The optics block 718 may comprise an optical element, such as an aperture, a Fresnel lens, a convex lens, a concave lens, a filter, or any other suitable optical element that affects the image light emitted from the electronic display 715. Moreover, the optics block 718 may include combinations of different optical elements. In some embodiments, one or more of the optical elements in the optics block 718 may have one or more coatings, such as partial reflectors or anti-reflective coatings.

Magnification of the image light by the optics block 718 allows the electronic display 715 to be physically smaller, weigh less, and consume less power than larger displays. Additionally, magnification may increase a field of view of the displayed content. For example, the field of view of the displayed content is such that the displayed content is presented using almost all (e.g., 110° diagonal), and in some cases all, of the user's instantaneous field of view. In some embodiments, the optics block 718 is designed so its effective focal length is larger than the spacing to the electronic display 715, which magnifies the image light projected by the electronic display 715. Additionally, in some embodiments, the amount of magnification may be adjusted by adding or removing optical elements.

The optics block 718 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal comatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error. In some embodiments, content provided to the electronic display 715 for display is pre-distorted, and the optics block 718 corrects the distortion when it receives image light from the electronic display 715 generated based on the content.

The locators 720 are objects located in specific positions on the HMD 705 relative to one another and relative to a specific reference point on the HMD 705. A locator 720 may be a light emitting diode (LED), a corner cube reflector, a reflective marker, a type of light source that contrasts with an environment in which the HMD 705 operates, or some combination thereof. In embodiments where the locators 720 are active (i.e., an LED or other type of light emitting device), the locators 720 may emit light in the visible band (~380 nm to 750 nm), in the infrared (IR) band (~750 nm to 1700 nm), in the ultraviolet band (10 nm to 380 nm), some other portion of the electromagnetic spectrum, or some combination thereof.

In some embodiments, the locators 720 are located beneath an outer surface of the HMD 705, which is transparent to the wavelengths of light emitted or reflected by the locators 720 or is thin enough not to substantially attenuate the wavelengths of light emitted or reflected by the locators 720. Additionally, in some embodiments, the outer surface or other portions of the HMD 705 are opaque in the visible band of wavelengths of light. Thus, the locators 720 may emit light in the IR band under an outer surface that is transparent in the IR band but opaque in the visible band.

The IMU 730 is an electronic device that generates IMU data based on measurement signals received from one or more of the position sensors 725. A position sensor 725 generates one or more measurement signals in response to motion of the HMD 705. Examples of position sensors 725 include: one or more accelerometers, one or more gyroscopes, one or more magnetometers, another suitable type of sensor that detects motion, a type of sensor used for error correction of the IMU 730, or some combination thereof. The position sensors 725 may be located external to the IMU 730, internal to the IMU 730, or some combination thereof.

Based on the one or more measurement signals from one or more position sensors 725, the IMU 730 generates IMU data indicating an estimated position of the HMD 705 relative to an initial position of the HMD 705. For example, the position sensors 725 include multiple accelerometers to measure translational motion (forward/back, up/down, left/right) and multiple gyroscopes to measure rotational motion (e.g., pitch, yaw, and roll). In some embodiments, the IMU 730 rapidly samples the measurement signals and calculates the estimated position of the HMD 705 from the sampled data. For example, the IMU 730 integrates the measurement signals received from the accelerometers over time to estimate a velocity vector and integrates the velocity vector over time to determine an estimated position of a reference point on the HMD 705. Alternatively, the IMU 730 provides the sampled measurement signals to the console 710, which determines the IMU data. The reference point is a point that may be used to describe the position of the HMD 705. While the reference point may generally be defined as a point in space; however, in practice the reference point is defined as a point within the HMD 705 (e.g., a center of the IMU 730).

The IMU 730 receives one or more calibration parameters from the console 710. As further discussed below, the one or more calibration parameters are used to maintain tracking of the HMD 705. Based on a received calibration parameter, the IMU 730 may adjust one or more IMU parameters (e.g., sample rate). In some embodiments, certain calibration parameters cause the IMU 730 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The eye tracking unit 760 tracks a user's eye position and/or movement. In some embodiments, the eye tracking unit 760 comprises an imaging device such as a camera configured to capture one or more images of the user's eye. The eye tracking unit 760 may determine the position of the user's eye based upon the captured images. For example, in some embodiments, the eye tracking unit 760 uses shape recognition to identify the user's iris or pupil within the captured images, which may be used to determine the user's eye position. In other embodiments, the eye tracking unit 760 may identify one or more portions of a light pattern projected onto the user's eye (e.g., the user's cornea and/or pupil), which can be used to determine the gaze angle of the user's eye. In some embodiments, the eye tracking unit 760 may comprise an OCT eye tracking unit.

The eye tracking unit 760 uses the tracked eye movement to determine one or more characterization parameters. A characterization parameter characterizes a function that is based in part on the positions or movements of at least one of the user's eyes. A characterization parameter may be, e.g., a fixation point (where the user is looking), and gaze time (how long the user is looking a particular direction), a vergence angle (an angle between two eyes when the user changes viewing distance and gaze direction), an inter-pupillary distance (IPD) of the user, an identification of the user, an eye's torsional state, some other function based on position of one or both eyes, or some combination thereof. In one embodiment, the eye tracking unit 760 may estimate different types of eye movements based on the detected characterization parameters. For example, if the eye tracking unit 760 detects a user looks at a same location for at least a threshold time, the eye tracking unit 760 determines the user's eye fixed on a particular point. If the eye tracking unit 760 detects the user rapidly shifting orientation back and forth between two points of fixation, the eye tracking unit 760 determines the user's eye movement is a saccade (e.g., may occur while reading, thinking, etc.). If the eye tracking unit 760 detects the user shifting orientation regularly for at least a threshold time, the eye tracking unit 760 determines the user' eye movement is smooth pursuit (e.g., following a moving object). Based on the detected eye movement, the eye tracking unit 760 communicates with the console 710 for further processing, as further explained below.

In some embodiments, the eye tracking unit 760 allows a user to interact with content presented to the user by the console 710 based on the detected eye movement. Example interactions by the user with presented content include: selecting a portion of content presented by the console 710 (e.g., selecting an object presented to the user), movement of a cursor or a pointer presented by the console 710, navigating through content presented by the console 710, presenting content to the user based on a gaze location of the user, or any other suitable interaction with content presented to the user.

The imaging device 735 captures image data in accordance with calibration parameters received from the console 710. The image data includes one or more images showing observed positions of the locators 720 that are detectable by the imaging device 735. The imaging device 735 may include one or more cameras, one or more video cameras, any other device capable of capturing images including one or more of the locators 720, or some combination thereof. Additionally, the imaging device 735 may include one or more hardware and software filters (e.g., used to increase signal to noise ratio). The imaging device 735 is configured to detect light emitted or reflected from locators 720 in a field of view of the imaging device 735. In embodiments where the locators 720 include passive elements (e.g., a retroreflector), the imaging device 735 may include a light source that illuminates some or all of the locators 720, which retro-reflect the light towards the light source in the imaging device 735. Image data is communicated from the imaging device 135 to the console 710, and the imaging device 735 receives one or more calibration parameters from the console 710 to adjust one or more imaging parameters (e.g., focal length, focus, frame rate, ISO, sensor temperature, shutter speed, aperture, etc.).

The input interface 740 is a device that allows a user to send action requests to the console 710. An action request is a request to perform a particular action. For example, an action request may be to start or end an application or to perform a particular action within the application. The input interface 740 may include one or more input devices. Example input devices include: a keyboard, a mouse, a game controller, or any other suitable device for receiving action requests and communicating the received action requests to the console 710. An action request received by the input interface 740 is communicated to the console 710, which performs an action corresponding to the action request. In some embodiments, the input interface 740 may provide haptic feedback to the user in accordance with instructions received from the console 710. For example, haptic feedback is provided when an action request is received, or the console 710 communicates instructions to the input interface 740 causing the input interface 740 to generate haptic feedback when the console 710 performs an action.

The console 710 provides content to the HMD 705 for presentation to the user in accordance with information received from one or more of: the imaging device 135, the HMD 705, the input interface 740, and the eye tracking unit 760. In the example shown in FIG. 7, the console 710 includes an application store 745, a tracking module 750, and an engine 755. Some embodiments of the console 710 have different modules than those described in conjunction with FIG. 7. Similarly, the functions further described below may be distributed among components of the console 710 in a different manner than is described here.

The application store 745 stores one or more applications for execution by the console 710. An application is a group of instructions, that when executed by a processor, generates content for presentation to the user. Content generated by an application may be in response to inputs received from the user via movement of the HMD 705, the input interface 140, or the eye tracking unit 760. Examples of applications include: gaming applications, conferencing applications, video playback application, or other suitable applications.

The tracking module 750 calibrates the HMD system 700 using one or more calibration parameters and may adjust one or more calibration parameters to reduce error in determination of the position of the HMD 705. For example, the tracking module 750 adjusts the focus of the imaging device 735 to obtain a more accurate position for observed locators on the HMD 705. Moreover, calibration performed by the tracking module 750 also accounts for information received from the IMU 730. Additionally, if tracking of the HMD 705 is lost (e.g., the imaging device 735 loses line of sight of at least a threshold number of the locators 720), the tracking module 860 re-calibrates some or all of the HMD system 700.

The tracking module 750 tracks movements of the HMD 705 using image data from the imaging device 135. The tracking module 750 determines positions of a reference point of the HMD 705 using observed locators from the image data and a model of the HMD 705. The tracking module 750 also determines positions of a reference point of the HMD 705 using position information from the IMU information. Additionally, in some embodiments, the tracking module 750 may use portions of the IMU information, the image data, or some combination thereof, to predict a future location of the HMD 705. The tracking module 750 provides the estimated or predicted future position of the HMD 705 to the engine 755.

The engine 755 executes applications within the HMD system 700 and receives position information, acceleration information, velocity information, predicted future positions, or some combination thereof of the HMD 705 and eye tracking unit 760 from the tracking module 750. Based on the received information, the engine 755 determines content to provide to the HMD 705 for presentation to the user. For example, if the received information indicates that the user has looked to the left, the engine 755 generates content for the HMD 705 that mirrors the user's movement in a virtual environment. Similarly, if information received from the eye tracking unit 760 indicates the user gazing on a location, the engine 755 generates content based on the identified gazing location, such as a visual representation of the scene at the gazing location with an original display resolution and surrounding scenes with a reduced display resolution. Additionally, in some embodiments, if the received information indicates that tracking of the eye tracking unit 760 is lost, the engine 755 generates content indicating the HMD 705 needs to be adjusted for presentation by the HMD 705. Additionally, the engine 755 performs an action within an application executing on the console 710 in response to an action request received from the Input interface 740, or the eye tracking unit 760 and provides feedback to the user that the action was performed. The provided feedback may be visual or audible feedback via the HMD 705 or haptic feedback via the input interface 740. For example, the Engine 755 receives an action from the eye tracking unit 760 to open an application, so the Engine 755 opens the application and presents content from the application to the user via the HMD 705.

FIG. 8 illustrates a high level block diagram illustrating a system environment suitable for operation of a social network system. The system environment comprises one or more client devices 810, one or more third-party websites 840, a social network system 800, and a network 820. In alternative configurations, different and/or additional modules can be included in the system.

The client devices 810 comprise one or more computing devices that can receive member input and can transmit and receive data via the network 820. For example, the client devices 810 may be desktop computers, laptop computers, smart phones, personal digital assistants (PDAs), or any other device including computing functionality and data communication capabilities. For example, in some embodiments the HMD system 700 (e.g., console 710 and/or HMD 705) may correspond to a client device 810. The client devices 810 are configured to communicate via network 820, which may comprise any combination of local area and/or wide area networks, using both wired and wireless communication systems.

The social network system 800 comprises a computing system that allows members of the social network to communicate or otherwise interact with each other and access content as described herein. Furthermore, the social network system 800 may select and provide content items to the HMD 705 as discussed herein. The social network system 800 stores member profiles that describe the members of a social network, including biographic, demographic, and other types of descriptive information, such as work experience, educational history, hobbies or preferences, location, and the like. The social network system 800 may further store data describing one or more relationships between different members. The relationship information may indicate members who have similar or common work experience, group memberships, hobbies, or educational history. Additionally, the social network system 800 includes member-defined relationships between different members, allowing members to specify their relationships with other members. For example, these member defined relationships allow members to generate relationships with other members that parallel the members' real-life relationships, such as friends, co-workers, partners, and so forth. Members may select from predefined types of relationships, or define their own relationship types as needed.

In some embodiments, the client devices 810 may receive content items to be displayed from the social network system 800 or the third party website 840. For example, in some embodiments, the social network system 800 may leverage a user's social network information (e.g., user attributes, preferences, relationships with other members of the social network system) to determine content to be presented to the user at an HMD system (e.g., the HMD system 700).

The social network system 800 may store social network information corresponding to the user of the HMD system. The social network information may indicate relationships between the user and other users of the social network (e.g., friend relationships), user preferences (e.g., likes/dislikes), and/or the like. In some embodiments, the social network system 800 may transmit content to the HMD 705 and/or the console 710 to be displayed to the user. For example, the social network system 800 may, based upon the social network information corresponding to the user and/or objects displayed in the (e.g., central region) of the HMD 705, suggest one or more content items to be displayed to the user. In some embodiments, the social network system may leverage social network information corresponding to other users connected to the user via a social network relationship in order to suggest content items to be displayed.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed:

1. A head-mounted display (HMD), comprising:
an electronic display having a display region comprising a central region and a periphery region defined outside of the central region, the central region and the periphery region corresponding to fixed and different regions on the electronic display, wherein the central region is positioned such that it is in front of a head of a user irrespective of head orientation of the user;
an eye tracking system configured to determine a position and movement of an eye of the user of the head-mounted display;
a processor configured to: generate instructions to cause the electronic display to display a content item within the periphery region of the electronic display;
determine that the user's eye has moved from being directed to the central region to being directed at the content item displayed within the periphery region of the electronic display, based upon a determined position and movement of the user's eye determined by the eye tracking system;
perform a first change of a visual property of the content item based upon the determined position and movement of the user's eye determined by the eye tracking system.

2. The HMD of claim 1, wherein the central region has a size on the electronic display corresponding with a binocular field of view of the eyes of the user.

3. The HMD of claim 2, wherein the binocular field of view is 90°.

4. The HMD of claim 1, wherein the periphery region corresponds with a region of the electronic display outside a 90° field of view in front of the head of the user.

5. The HMD of claim 1, wherein the first change of the visual property of the content item comprises at least one of: changing an opacity of the content item; changing a size of the content item; changing a color of the content item; changing a location of the content item within the display region; updating the content item with a second content item; and providing a reference to the second content item.

6. The HMD of claim 1, wherein the processor is further configured to: determine that the position of the user's eye is directed at the content item for at least a threshold period of time; and
perform the first change of the visual property of the content item in response to determining that the position of the user's eye is directed at the content item for at least the threshold period of time.

7. The HMD of claim 1, wherein the processor further configured to: associate a spatial location with the content item; determine a spatial location of a hand of the user;
determine that the spatial location of the hand corresponds with the content item; and
in response to determining that the position of the eve is directed at the content item within the periphery region of the electronic display and that the spatial location of the hand corresponds with the spatial location associated with the content item, perform the first change of the visual property of the content item.

8. The HMD of claim 1, wherein the processor is further configured to perform the first change of the visual property of the content item based upon a threshold amount of time after the content item is displayed.

9. The HMD of claim 1, wherein the processor is further configured to: in response to a determination that the position of the user's eye is directed towards a region of the electronic display outside the periphery region, perform a second change of a visual property of the content item.

10. The HMD of claim 9, wherein the second change of the visual property of the content item is configured to revert the first change.

11. A system comprising:
an HMD comprising:
an electronic display having a display region comprising a central region and a periphery region defined outside of the central regions, the central region and the periphery region corresponding to fixed and different regions on the electronic display, wherein the central region is positioned such that it is in front of a head of a user irrespective of head orientation of the user, and
an eye tracking system configured to determine a position and movement of an eye of a user of the head-mounted display;
a console comprising a processor, the processor configured to:
generate instructions to cause the electronic display to display a content item within the periphery region of the electronic display,
determine that the user's eye has moved from being directed to the central region to being directed at the content item displayed within the periphery region of the electronic display, based upon a determined position and movement of the user's eye determined by the eye tracking system, and
generate instructions to perform a first change of a visual property of the content item based upon the determined position and movement of the user's eye determined by the eye tracking system.

12. The system of claim 11, wherein the central region has a size on the electronic display corresponding with a binocular field of view of the eyes of the user.

13. The system of claim 12, the binocular field of view is 90°.

14. The system of claim 11, wherein the periphery region corresponds with a region of the electronic display outside a 90° field of view in front of the head of the user.

15. The system of claim 11, wherein the first change of the visual property of the content item comprises at least one of: changing an opacity of the content item; changing a size of the content item; changing a color of the content item; changing a location of the content item within the display region; updating the content item with a second content item; and providing a reference to the second content item.

16. The system of claim 11, wherein the processor is further configured to: determine that the position of the user's eye is directed at the content item for at least a threshold period of time; and
generate instructions to perform the first change of the visual property of the content item in response to determining that the position of the user's eye is directed at the content item for at least the threshold period of time.

17. The system of claim 11, wherein the processor is further configured to: associate a spatial location with the content item; determine a spatial location of a hand of the user;

determine whether the spatial location of the hand corresponds with the content item; and in response to determining that the position of the eye is directed at the content item within the periphery region of the electronic display and that the spatial location of the hand corresponds with the spatial location associated with the content item, generate instructions to perform the first change of the visual property of the content item.

18. The system of claim 11, wherein the processor is further configured to generate instructions to perform the first change of the visual property of the content item based upon a threshold amount of time after the content item is displayed.

19. The system of claim 11, wherein the processor is further configured to: in response to a determination that the position of the user's eye is directed towards a region of the electronic display outside the periphery region, generate instructions to perform a second change of a visual property of the content item.

20. The system of claim 19, wherein the second change of the visual property of the content item is configured to revert the first change.

21. The HMD of claim 1, wherein the central region of the display is in a fixed position relative to an eye-box of the head-mounted display.

22. The HMD of claim 1, further comprising: a head tracking unit comprising one or more sensors configured to track a movement of the user's head; and wherein the processor is configured to, responsive to the determination that the position of the eye is directed at the content item, determine whether to perform the first change of the visual property of the content item responsive to a determination of whether a movement of the user's head during a time period associated with the position of the eye being directed at the content item indicates a change in the user's head orientation of less than or more than a threshold amount.

\* \* \* \* \*

UNITED STATES PATENT AND TRADEMARK OFFICE
CERTIFICATE OF CORRECTION

PATENT NO. : 10,845,595 B1  
APPLICATION NO. : 15/857522  
DATED : November 24, 2020  
INVENTOR(S) : Alexander Sohn et al.

Page 1 of 1

It is certified that error appears in the above-identified patent and that said Letters Patent is hereby corrected as shown below:

In the Claims

Column 21, Line 60, Claim 7, delete "in response to determining that the position of the eve is" and insert -- in response to determining that the position of the eye is --.

Column 22, Line 42, Claim 13, delete "The system of claim 12, the binocular" and insert -- The system of claim 12, wherein the binocular --.

Column 24, Line 11, Claim 22, delete "responsive to the determination that the position of the eve is" and insert -- responsive to the determination that the position of the eye is --.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*